United States Patent [19]
de Ligt et al.

[11] 3,872,962
[45] Mar. 25, 1975

[54] CONVEYOR FOR ASSEMBLING PANELS FROM ELONGATED STRIPS

[75] Inventors: John de Ligt; Clifford D. Shelor, both of Covington, Va.

[73] Assignee: Westvaco Corporation, New York, N.Y.

[22] Filed: Jan. 10, 1973

[21] Appl. No.: 322,484

Related U.S. Application Data

[62] Division of Ser. No. 165,017, July 22, 1971, Pat. No. 3,733,235.

[52] U.S. Cl.............. 198/24, 198/29, 271/181
[51] Int. Cl............................... B65g 47/34
[58] Field of Search............ 198/24, 29, 33 AB; 214/8.5 F, 1 BB; 271/3.1, 181

[56] References Cited
UNITED STATES PATENTS

| | | | |
|---|---|---|---|
| 2,724,484 | 11/1955 | McCoy | 198/24 |
| 2,884,114 | 4/1959 | Oberwelland | 198/24 |
| 2,983,361 | 5/1961 | Tibbals | 198/24 |
| 3,581,872 | 6/1971 | Grossjohann | 198/41 |
| 3,655,180 | 4/1972 | Holler | 198/24 |

*Primary Examiner*—Richard A. Schacher
*Assistant Examiner*—Jeffrey V. Nase
*Attorney, Agent, or Firm*—W. Allen Marcontell; R. L. Schmalz

[57] ABSTRACT

Apparatus for fabricating high strength to weight ratio structural panels from sheet stock such as corrugated paper board having a major strength plane and direction by slicing strips of said sheet stock along a cutting plane transverse to said major strength plane and direction. Such strips are delivered edge-to-edge along a conveyance line into a collimating breech. Each strip is serially thrust into the collimating breech along a direction parallel with the strip faces and ends thereof. Sequentially, each strip is struck against one face thereof by a reciprocating hammer to push it from the breech in a direction perpendicular to the strip face and into face-to-face engagement with the preceding strip.

4 Claims, 5 Drawing Figures

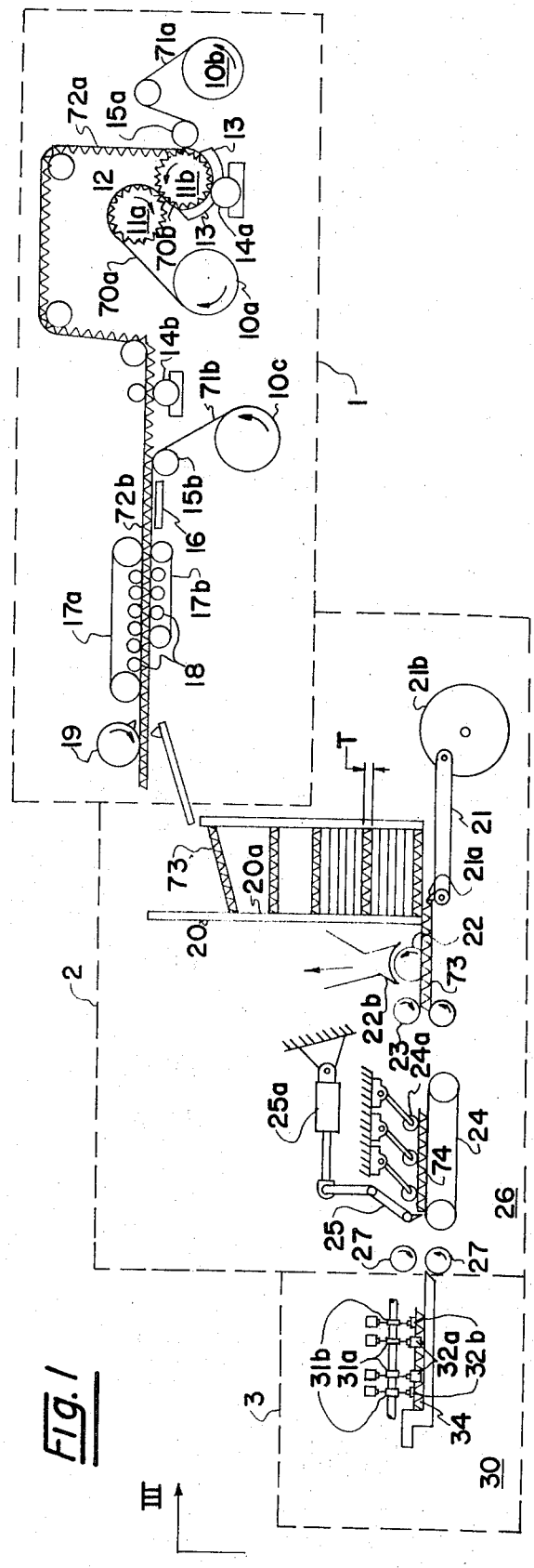

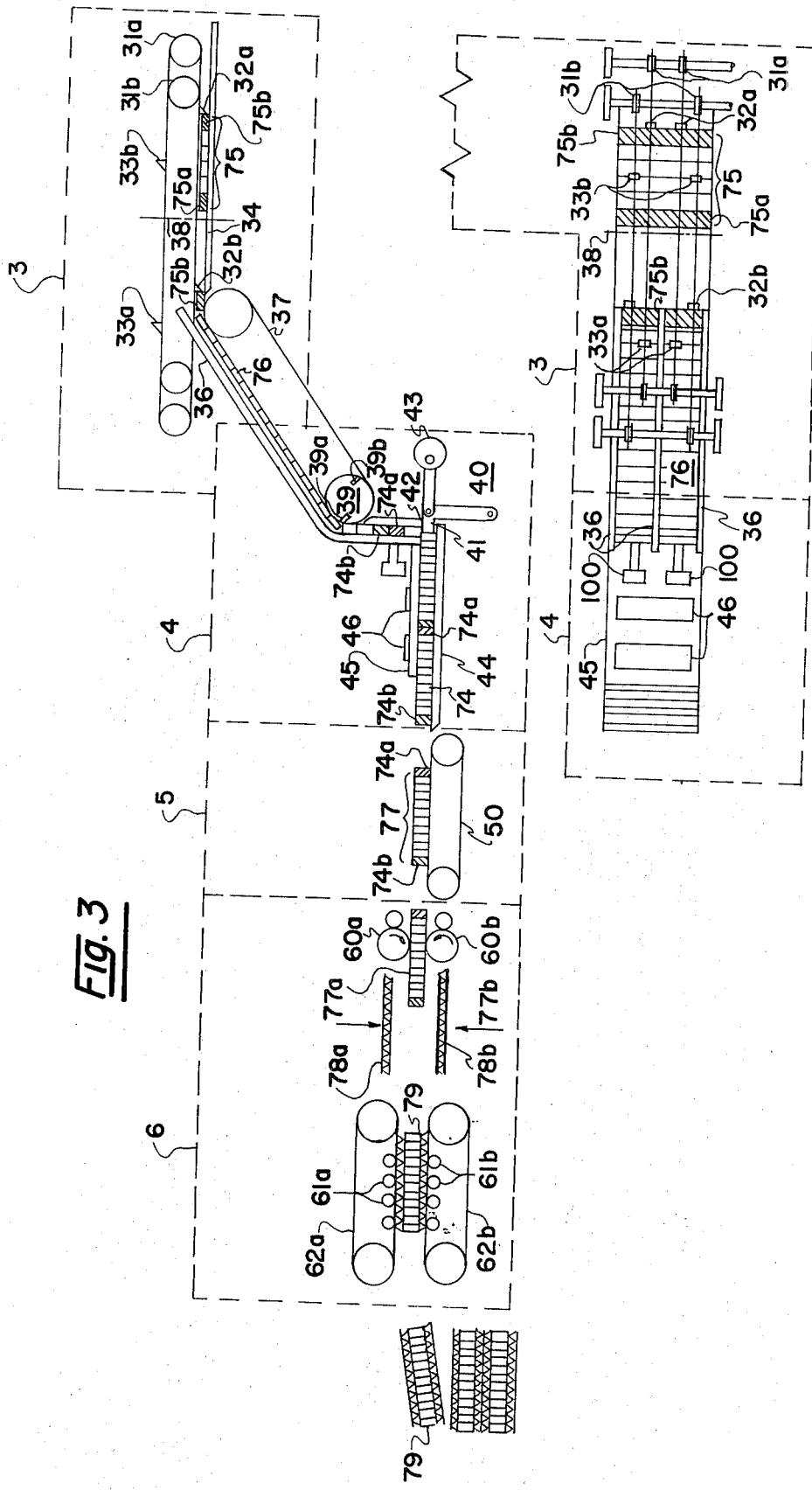

3,872,962

CONVEYOR FOR ASSEMBLING PANELS FROM ELONGATED STRIPS

CROSS REFERENCE TO RELATED APPLICATIONS

This is a division, of application Ser. No. 165,017, filed July 22, 1971 now issued a U.S. Pat. No. 3,733,235.

BACKGROUND OF THE INVENTION

1. Field of the Invention

This invention relates a method and apparatus for continuous, mechanized production of cellular cores for structural panels.

2. Description of the Prior Art

Cellular cores are known in the fabrication arts as sheet material management devices whereby structural panels having unusually high strength to weight ratios may be constructed. One such structural panel system comprises an alternating series of corrugated and flat thin sheet elements of solid material laminated together. Orientation of sheet planes and corrugation flute axes in the core elements of such composite panels is such that the centroidal axis providing the largest inertial moment is disposed parallel with the composite panel face plane. In other words, the sheet planes for both, the corrugated and flat elements, are substantially perpendicular to the panel face plane.

When combined with facing sheets secured to the planar surfaces defined by the aligned edges of the aforedescribed thin sheet elements, the resulting composite is a structural panel of unusually high strength-to-weight ratio. Depending on the material of construction, such panels have valuable utility as aircraft skins, static building panels and even material shipment platforms such as pallet decks.

In the past, utility of such panels has been limited to those applications where material cost was a secondary consideration to performance, a premium being placed on the favorable strength-to-weight ratio of such panels. The many repetitive forming, cutting, collating, collimating, aligning and bonding operations necessary to form the cellular cores for such panels by prior art methods have been slow and expensive.

SUMMARY

The present invention is directed to a method and apparatus for assembling construction elements for cellular cores that is rapid, continuous and adaptable to full mechanization and automation. Although this invention is particularly suitable to paper or thin fiberous board as the elemental material, the adaptability thereof for other ductile construction materials such as aluminum and steel should be obvious.

In accordance with the present teaching, corrugated sheets are adhesively joined with at least one planar facing sheet in a known manner before cutting, as by sawing or shearing, into long, narrow strips. The narrow width dimension of said strips determines the thickness dimension of a finished core and is oriented parallel to the corrugation flute axes, the major strength direction of the corrugated sheet. Said strips are subsequently transferred to a conveyance device where they are fed serially, edge-to-edge, along a direction parallel with said corrugation flute axes, into a colliminating device.

The collimating device comprises a rapidly reciprocating trip-hammer which pushes each strip laterally from the edge-to-edge conveyance plane into face-to-face alignment with the foregoing strip thereby clearing space for the next strip to advance into position against the collimating surface. Each cycle of the trip-hammer is co-ordinated with a cyclic strip advancing device for urging the next strip in the line thereof into striking position during the trip-hammer retracted half cycle.

At some point between the strip cutting operation and the collimating trip-hammer, adhesive must be applied to at least one face of the strips.

Subsequent to collimating, adhesive pressure and translatory motion rectification means are applied to the face-to-face strip series for a time period sufficient to set the adhesive and distance sufficient to prevent the face-to-face line of strips from resiliently expanding back into interference with the advancement of oncoming strips into the striking position during the retracted half-cycle of the trip-hammer.

Other objects of the invention include the discrete omission of adhesive from at least one strip entering the collimator to facilitate the subsequent segregation of completed core panels from the continuum emerging from the collimator.

To complete the fabrication into finished structural panels, it is only necessary to laminate facing sheets to the respective core faces.

BRIEF DESCRIPTION OF THE DRAWINGS

Relative to the drawing wherein like reference characters designate like or corresponding parts throughout the several views;

FIG. 1 is an elevational schematic of the corrugated panel fabricating and sawing operations of the present invention.

FIG. 2 is a plan schematic of the sawing and direction changing operations of the present invention.

FIG. 3 is an elevational schematic of the reoriented strip supply line at cut line III—III of FIG. 1, the collimating operation, separation of the core continuum into discrete core panels and application of panel facing sheets for final finishing.

FIG. 4 is a plan schematic of the reoriented supply and collimating operations of FIG. 3.

FIG. 5 is an enlarged view of the colliminator breech feed system.

DESCRIPTION OF THE PREFERRED EMBODIMENT

Relative to the elevation of FIG. 1, there is shown, within the area bounded by the dashed line 1, a corrugated web fabricator for solid sheet materials such as kraft paper or aluminum foil. Corrugated panels 73 of uniform size produced by the corrugated fabricator 1 are deposited in the feed hopper 20 of a strip cutting operation 2 to be cut into strips 74. From the cutting operation 2, the strips 74 are deposited at a direction change station 30 of a collimator feed conveyor 3. From the conveyor 3, the strips 74 are fed as a continuous line into a collimating and core panel fabrication operation 4 (FIGS. 3 and 4) to be reoriented and structurally bound together as an integral core element or panel 77. The continuous series of collimated strips 74 emerging from the core panel fabrication operation 4 is broken into discrete panels at the separation operation 5 in preparation of receiving facing sheets 78a and 78b by the panel face applicator 6.

The corrugated web operation 1 and strip cutting operation 2, respectively, may be performed independently in time and space of the collimating and core panel fabrication operation 4 but are most efficiently executed as antecedent functions.

Starting with the roll 10a (FIG. 1) of solid material sheet stock, web 70a is passed over the corrugating roll 11a and through the nip 12 formed by the meshing involutes of rolls 11a and 11b. Emerging from the nip 12, the corrugated web 70b is held against the involuted surface of roll 11b by retaining fingers 13. Adhesive, such as vegetable glue, is continuously applied to the involute crest lines of one web face by applicator roll 14a. An uncorrugated web 71a is reeled from roll 10b, passed over an idler roll and around nip roll 15a into pressured contact with the glue lines on corrugated web 70b to form a single faced corrugated web 72a. Other idler rolls direct the web 72a into the nip of glue applicator 14b so adhesive may be applied to the corrugation crest lines on the bottom face of web 72a. Reel 10c supplies the uncorrugated web 71b around nip roll 15b into pressured contact with said bottom crest glue lines to secure the remaining face of a double faced corrugated web 72b. Thereafter the web is drawn over a heater platen 16 by a pulling section comprising traction belts 17a and 17b driven between roller platens 18. Rotary knife 19 cuts the double-faced corrugated web 72b into corrugated panels 73 of uniform length and width which may be gravity dropped into feed hopper 20 of the strip cutting operation 2.

The vertical dimensional relationship between the bottom edge of hopper side 20a and the reciprocating lug 21a of the slider-crank feed mechanism 21 is such as to allow only one panel 73 to be sheared from beneath the hopper stack in a single cycle of the crank 21b.

Advancement of a panel 73 by the lug 21b engages the panel with cutting edges of gang saw 22. The spacing W (FIG. 2) between each circular blade 22a is such as to divide the panel 73 into a number of long, narrow, thin strips 74, each of uniform width W, length L and thickness T. Although a serrated circular saw has been found for the present to be the most satisfactory cutting device for kraft paper, one attendant disadvantage of a saw is the immense production of saw dust necessitating a vacuum removal system 22b. Another disadvantage of the circular saw is material wastage from the saw kerf. Depending on the properties of the solid sheet stock 70 and 71 and the related economics, other cutting techniques such as rotary shears, band saws, hydraulic jets or lasers may be utilized since the cutting function is to completely separate each strip 74 from the one next adjacent.

It should also be noted that orientation of the panel 73 relative to the cutting planes of saw 22 is important to achieve optimum product strength. For corrugated panels from the aforedescribed fabricating operation 1, the cutting planes should be perpendicular to the corrugation flute axes i.e. the major compressive strength direction of panels 73.

Since the stroke of slider-crank mechanism 21 is only sufficient to start the panel 73 through the saw 22, nip rolls 23 are employed to tractionally complete the panel cut pass. As it is not desirable to interrupt the continuity of the panel cut pass, nip rolls 23 rotate constantly to complete all panel cuts started by the slider crank 21.

For the purpose of subsequent orientation, the several surfaces of each strip 74 shall be characterized as faces, edges and ends. Since each strip is a slender, elongated parallelepiped, the respective face, edge and end planes are mutually substantially perpendicular. In the context of this disclosure, the two face planes (faces) shall be the two parallel rectangular surfaces of a strip having the greatest planar area. The two edge planes are parallel rectangular surfaces also, but are co-extensive in length with the faces and are perpendicular to the two face planes. Similarly, the end planes are parallel rectangular surfaces that are mutually perpendicular to both, the face and edge planes.

Consistent with the foregoing, the length of a strip shall be the greatest linear dimension thereof measured along the planar intersection of a face and an edge. The width of a strip shall be the dimension across a face plane perpendicular to the length dimension. The thickness of a strip shall be the linear distance between the two parallel face planes and perpendicular thereto.

From the nip of rolls 23, a strip group 75 comprising strips 74 respective to a single panel 73 is deposited on a continuously moving belt conveyor 24 and restrained by weight rolls 24a to the same relative orientation as cut. However, selective deployment of the retractable fence 25 by electric or fluid powered linear actuator 25a operates to make the conveyor 24 an effective holding station 26. Fence 25 obstructs the progress of group 75 as belt 24 slips thereunder.

When conditions are correct for receipt of the strip group 75 by one of the endless tensile conveyance lines 31a or 31b at the direction change station 30, the fence 25 is lifted by a functioning of the actuator 25a whereupon the belt conveyor 24 is allowed to advance the group 75 into the nip of constantly rotating discharge rolls 27.

Allowing sufficient time to complete the transfer of strip group 75 from the holding station 26 to the direction change station 30, lugs 32a of the inside running tensile conveyor 31a engage the outermost longitudinal edge of the outermost strip 75b to advance the strip group 75 along the sliding surface 34.

Tensile conveyors 31a and 31b, which may be chains, belts, ropes, etc. running on overhead sprockets or sheaves are each driven independently through respective variable speed - force limiting devices such as torque limiters 35a and 35b. When the control logic explained hereafter releases either of the conveyors 31a or 31b to advance a strip group 75 along the flow direction, the conveyor does so with the greatest permissible speed consistent with maintaining the order and alignment of all strips 74 within the group. This speed should be significantly greater than the fastest rate capacity of collimator 4. Accordingly, the leading strip 75a of the group 75 propelled by lugs 32a will overtake the trailing strip 75b of the preceding group propelled by lugs 32b whereupon the speed will be goverened by the prevailing rate of the collimator. Since it is highly desirable to advance the series of strips 76 into the collimator 4 in longitudinal edge-to-edge abutment between respective strips, it is necessary to maintain a constant, light pushing force upon the trailing strip of the series by the respective lugs. These several criteria of variable speed and constant force may be performed by a base mounted, input clutch - brake module specified as EM-180-20-30 B in Master Catalog No. 67 of the Warner Electric Brake and Clutch Co., Beloit, Wis.

After the strip series on the collimator feed line 3 passes under the vertical restraining tines 36, a planar divergence is provided between the respective paths of lugs 32 and 33 and the strip feed plane 34 to allow the withdrawal of a lug set.

In the embodiment shown, each tensile conveyance line 31a and 31b is provided with two sets of peripherially opposite lugs: 32a and 33a; and 32b and 33b, respectively. Therefore, in each line 31a and 31b, one pair of lugs, 33a for example, is advancing toward the direction change station 30 while the other set, 32a, is proceeding away with a strip group 75.

Belt conveyor 37 propels the strip line 76 into the collimator 40 after the withdrawal of tensile conveyor lugs therefrom. Additional thrust to each strip 74 is provided from dogs 39a and 39b which are compliant, centrifugal extensions of belt sheave 39. Dogs 39a and 39b provide a concentrated, positive loading force for collimator breech 41 to assure that a single strip 74 advances completely into the breech 41 during the reciprocatory half-cycle interim that the trip-hammer 42 is withdrawn therefrom.

As shown in greater detail by FIG. 5, belt conveyor 37 of the collimator breech feed system is threaded about a sheave on the same axis as that of sheave 39. If desired, a plurality of narrow belts 37 may be distributed across the machine threaded over respective sheaves alternately separated by sheaves 39.

The dogs 39a and 39b on sheave 39 must be firm to translate a strong frictional drag force to the strips 76 but simultaneously retain sufficient compliance to yield upon contact with the strip faces. A resilient element such as elastomer fingers, brushes, or centrifugally swinging rods will not break and tear the strip 74 skins comprising web material 70a and 71a.

Although not critical, the line of belt conveyor 37 is a convenient location for one or more adhesive applicators 100 to dispense adhesive to at least one face of strips 74. The characterization of adhesive is used broadly herein and intended to encompass any substance or technique suitable for structurally securing the individual strips 74 together in face-to-face contact subsequent to collimation. Depending on the material properties of the elemental sheet, such substances may include animal, vegetable and casein glues; resorcinols, epoxy, and urea-formaladehyde resins; polyvinylacetate; plastic; rubber; silicone rubber; and hot melt. In some instances, welding, brazing or soldering may be suitable.

It should be further understood that the primary purpose of face-to-face adhesion between respective strips 74 is the temporary one of preserving structural unity and integrity of a collimated core panel 77 until the faces 78a and 78b can be structurally secured thereto. The adhesive bond between adjacent strips 74 contributes little to the structural strength of the finished panel.

The actual collimating function is performed as an individual strip 74 is thrust edge first into the breech 41 against the surface of table 44 with the corrugation flute axes perpendicular thereto. Trip-hammer 42, cyclically driven by eccentric 43, strikes one face of the strip 74 to push it clear of the breech 41; into intimate, face-to-face contact with the preceding strip; and to advance the entire, collimated series of strips along the table surface 44. In consideration of the above latter function, design account should be taken of the accumulating mass in said collimated series and the consequent inertia thereof as a factor directly related to an individual strip 74 crushing force along an axis perpendicular to the face thereof.

Due to the considerable resilience of corrugated sheet, it is necessary to rectify the motion of the collimated strip series in the vicinity of the breech 41. Otherwise, the series would quickly reach a point where translatory motion under the hammer 42 impact would only or partially be a longitudinal resilient deflection rather than linear indexing and would expand back into the breech 41 during the hammer withdrawal half cycle. This necessary rectification may be simply performed by a thick sheet 45 of moderately soft, amorphous material such as an elastomer of approximately 65 durometer hardness. An alternative to an elastomer sheet may comprise a brush of stiff, fabric pile. With the upstream end of the sheet 45 secured to the collimator frame and the sheet 45 plane bearing normally against the upper surface 77a of the collimated strip series under the force of trimming weights 46, the elastomer tends to flow into the corrugation flute channels open to the core face plane. The shear interface between the collimated series and the elastomer 45 is easily overcome by the force of hammer 42, but provides significant resistance to the resilient expansion of individual strips 74.

A further function provided by the elastomer sheet 45 may be that of a small adhesive setting pressure between the respective strips 74 in the series for a short time following face-to-face contact.

Subsequent to collimation, it is necessary to sever and separate discrete segments from the continuously emerging series line thereof. Such separation is necessary; first, to control inertia growth of the series; and second, to finally produce core panels 77 of a practicable, marketable size. One particularly efficient technique for severance is to periodically eliminate adhesive from one or more successive strips. Due to timing criticality, the present invention omits adhesive for a distance equal to the width, W, of two strips 74a and 74b. This technique assures no adhesive on at least one strip. There being no adhesive to bond the collimated interface, a core panel 77 segment may be separated from the emerging line merely by advancing said line from the end of the collimating table 44 onto a separation conveyor 50 traveling at a surface speed greater than the emerging series.

At this point, fabrication of a core panel 77 is complete. Although face panels 78a and 78b are normally applied to upper and lower core surfaces 77a and 77b, respectively, to complete a laminated structural panel 79, like the strip sawing operation, the face application step may be performed separately in time and space. For maximum efficiency, however, each panel 77 may be conveyed directly from the separation conveyor 50 into an adhesive application nip between rolls 60a and 60b. Upon emerging from the nip of rolls 60a and 60b, face panels 78a and 78b are applied to the respective core faces 77a and 77b. These face panels 78a and 78b may, like panels 73, be continuously emerging products of another corrugated web fabricator such as 1 of FIG. 1. If face panels 78a and 78b are of corrugated stock, optimum panel strength may be derived by orienting the flute axes thereof perpendicular to the interface planes between strips 74.

Subsequent to facing with panels 78a and 78b, as a final step, the structural panels 79 are conveyed on traveling belt surfaces 62a and 62b between opposing pressure platens 61a and 61b to set the face panel adhesive.

A prototype machine of the aforedescribed type was designed, assembled and tested in the Covington Research Center of the Westvaco Corporation, Covington, Va., and achieved a sustained linear core output 18.75 feet per minute starting with ⅜ inch thick, double face, A/A flute, 42 pound kraft paper corrugated board stock. At this production rate, trip-hammer 32 was cycling at the rate of 600 strokes per minute.

Intermittant production of 26.5 feet per minute at 850 hammer strokes per minute was achieved without difficulty. Sustained production at this higher rate presents no unexpected difficulties and should be readily achieved by adherence to sound machine design practice for the cyclical forces and rates involved.

In consideration of the foregoing disclosure, we claim the following new and unobvious:

We claim:

1. Apparatus for collimating a continuous series of long, narrow and thin sheet material strips having substantially parallel-planar ends, edges and faces of uniform length, width and thickness, said apparatus comprising:

first conveyance means for serially translating said strips in a first plane parallel with the planes of said faces and ends and in contiguous edge-to-edge abutment;

restraint means for restricting movement of said strips in either direction perpendicular to said face plane;

second conveyance means compliantly engaging one of said strip faces for sequentially thrusting each strip from said first conveyance means into collimating breech means with a force greater than provided by said first conveyance means;

reciprocating hammer means for sequentially striking each strip within said collimating breech on one of said faces thereof and translating each strip along a second plane and direction substantially perpendicular to said one face and into face-to-face contact with a preceding strip; and motion rectification means for restraining said strips from reverse movement back into said collimating breech means after said hammer means is withdrawn therefrom.

2. Apparatus as described by claim 1 wherein said second conveyance means thrust sequence is related to said hammer means strike sequence whereby at least one of said strips is thrust into said collimating breech during the time interval said hammer means is withdrawn from said breech.

3. Apparatus as described by claim 1 wherein said second conveyance means comprises centrifugally actuated means to frictionally engage at least one face of said strips.

4. Apparatus as described by claim 1 wherein said motion rectification means comprises a sheet of soft, amorphous material juxtapositionally disposed against one surface formed serially adjacent longitudinal strip edges.

* * * * *